(12) United States Patent
Matsunaga

(10) Patent No.: US 11,829,134 B2
(45) Date of Patent: Nov. 28, 2023

(54) DISPLAY CONTROL DEVICE AND DISPLAY CONTROL METHOD

(71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 153 days.

(21) Appl. No.: 17/485,451

(22) Filed: Sep. 26, 2021

(65) Prior Publication Data

US 2022/0011771 A1 Jan. 13, 2022

Related U.S. Application Data

(63) Continuation of application No. PCT/JP2019/014307, filed on Mar. 29, 2019.

(51) Int. Cl.
*G05D 1/00* (2006.01)

(52) U.S. Cl.
CPC ......... *G05D 1/0038* (2013.01); *G05D 1/0027* (2013.01); *G05D 2201/0213* (2013.01)

(58) Field of Classification Search
CPC ....... G05D 1/00–12; G05D 2201/0213; G05D 1/0027
See application file for complete search history.

(56) References Cited

U.S. PATENT DOCUMENTS

| | | | |
|---|---|---|---|
| 9,947,221 B1* | 4/2018 | Mazzola | G08G 1/096775 |
| 10,379,536 B2 | 8/2019 | Arai et al. | |
| 10,564,638 B1* | 2/2020 | Lockwood | G05D 1/00 |
| 2018/0356818 A1* | 12/2018 | Arai | B60W 50/14 |
| 2021/0029510 A1* | 1/2021 | Arai | H04W 28/0215 |
| 2021/0173400 A1 | 6/2021 | Hasegawa et al. | |

FOREIGN PATENT DOCUMENTS

| | | |
|---|---|---|
| JP | 2005-339117 A | 12/2005 |
| JP | 2010-134499 A | 6/2010 |
| JP | 2015-032054 A | 2/2015 |
| JP | 2018-060450 A | 4/2018 |
| JP | 2018-165762 A | 10/2018 |
| WO | 2017/110072 A1 | 6/2017 |
| WO | 2018/167891 A1 | 9/2018 |
| WO | 2020/202378 A1 | 10/2020 |

OTHER PUBLICATIONS

International Search Report and Written Opinion for PCT/JP2019/014307 dated Jul. 2, 2019.

* cited by examiner

*Primary Examiner* — Aaron L Troost
(74) *Attorney, Agent, or Firm* — Thomas | Horstemyer, LLP

(57) ABSTRACT

Described is a display control device that acquires a difficulty level of an automated traveling control of a mobile object. A display device for visual recognition by a person outside the mobile object whose difficulty level has been acquired is caused to perform display according to the acquired difficulty level.

13 Claims, 10 Drawing Sheets

F I G. 3
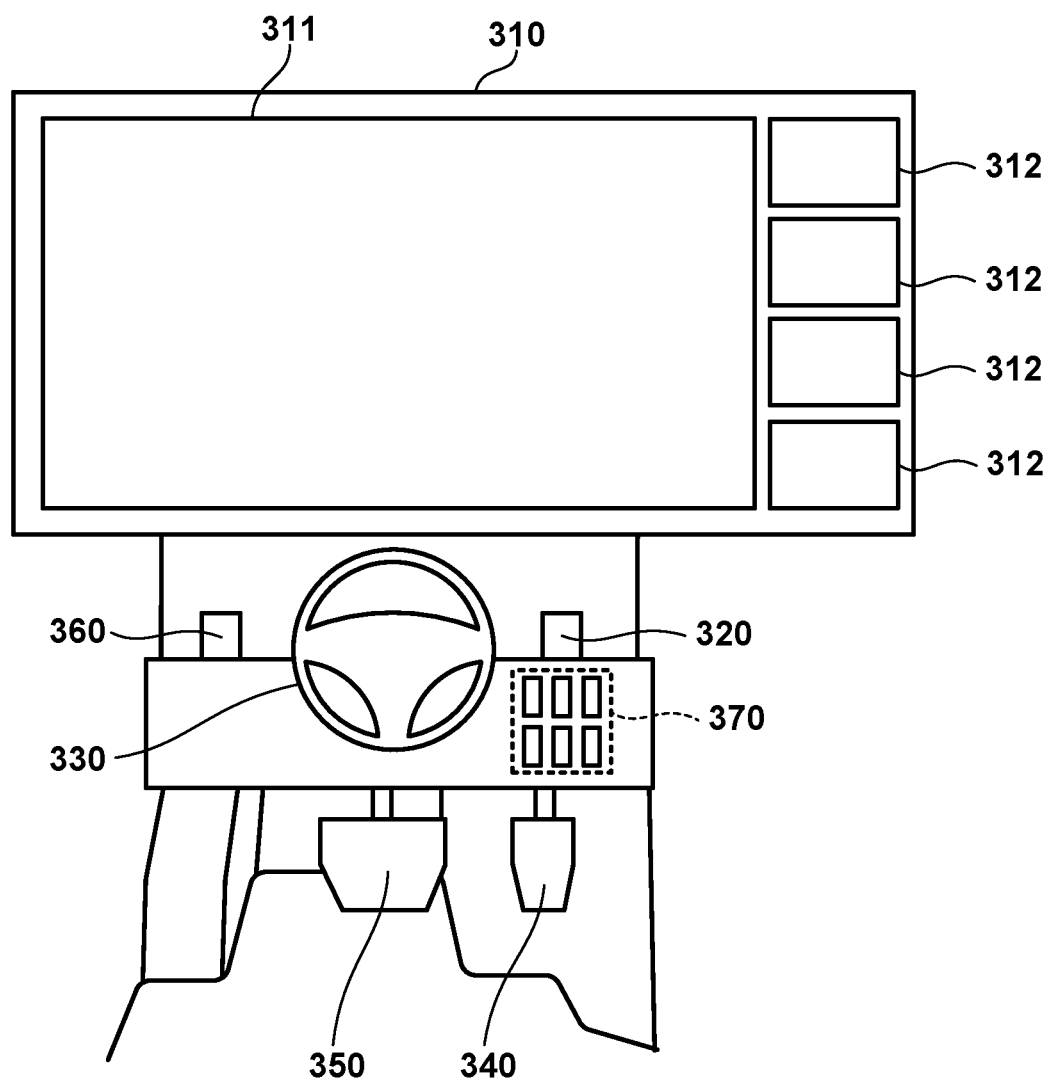

DISPLAY CONTROL DEVICE AND DISPLAY CONTROL METHOD

CROSS-REFERENCE TO RELATED APPLICATION(S)

This application is a continuation of International Patent Application No. PCT/JP2019/014307 filed on Mar. 29, 2019, the entire disclosures of which is incorporated herein by reference.

BACKGROUND OF THE INVENTION

Field of the Invention

The present disclosure relates to a display control device and a display control method.

Description of the Related Art

Various technologies related to automated driving of a vehicle have been proposed. Japanese Patent Laid-Open No. 2015-032054 proposes that a surrounding situation is evaluated from the viewpoint of a difficulty level of automated driving of a vehicle, and attention calling notification is made for a driver based on a result of the evaluation. In this case, the driver is prevented from becoming accustomed to the attention calling notification.

SUMMARY OF THE INVENTION

In the technology described in Japanese Patent Laid-Open No. 2015-032054, only information regarding the difficulty level of the automated driving is presented to the driver, and it cannot be said that this information can be effectively utilized. Some aspects of the present disclosure provide a technology for effectively utilizing information regarding a difficulty level of an automated traveling control of a mobile object.

In an embodiment, provided is a display control device including: an acquisition unit for acquiring a difficulty level of an automated traveling control of a mobile object; and a control unit for causing a display device for visual recognition by a person outside the mobile object whose difficulty level has been acquired to perform display according to the difficulty level.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a schematic diagram for describing an example of a console for remote driving according to the embodiment.

DESCRIPTION OF THE EMBODIMENTS

Figure 1:
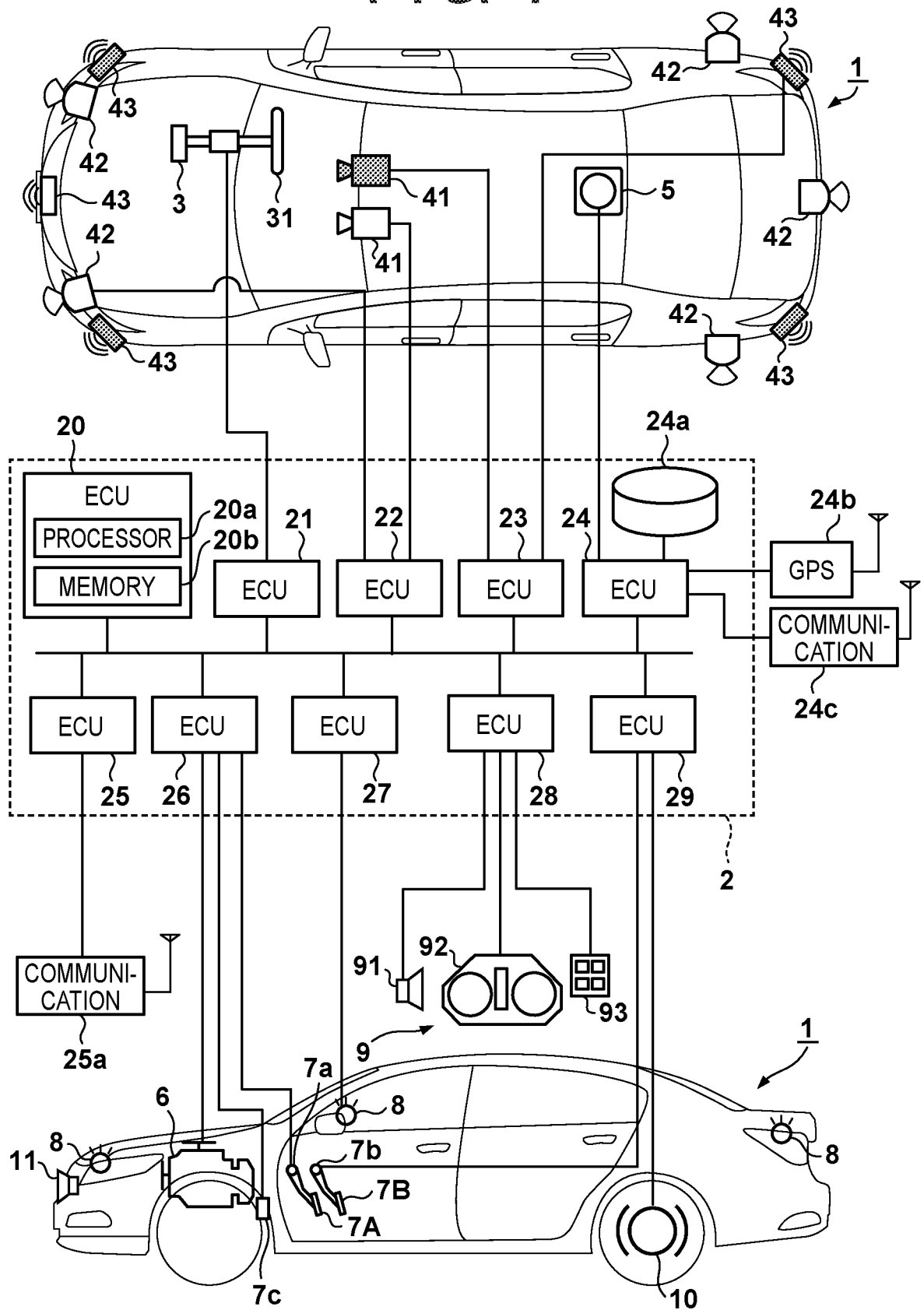
FIG. 1 is a block diagram for describing an example of a configuration of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24b, and a communication device 24c and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current position of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination and the like. The ECU 24, the map database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles. The communication device 25a is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission based on information such as a vehicle speed detected by a vehicle speed sensor 7c. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7b provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
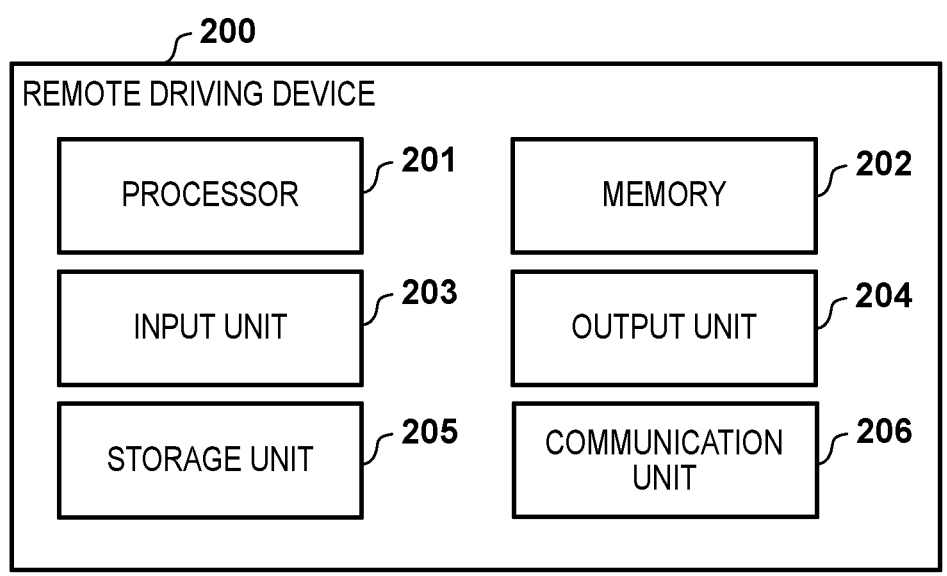
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Hereinafter, various embodiments of the present disclosure will be described with reference to FIGS. 4 to 10. These embodiments relate to a display control device. The display control device acquires a difficulty level of an automated traveling control of a vehicle, and causes a display device for visual recognition by a person outside the vehicle to perform display according to the difficulty level. The display control device may be included in the vehicle whose difficulty level is acquired, or may be included in the remote driving device 200. Furthermore, the display device may be mounted on the vehicle whose difficulty level is acquired, may be mounted on a vehicle different from the vehicle, or may be included in the remote driving device 200.

A case where a display control device 402 and a display device 403 are included in the same vehicle 1 will be described with reference to FIG. 4. The vehicle 1 includes a sensor group 401 that acquires data used to acquire the difficulty level of the automated traveling control. The sensor group 401 includes, for example, detection units 41 to 43 that detect a situation outside the vehicle and sensors that measure the vehicle speed of the vehicle 1. In addition, this data may include a route planned by the ECU 20.

The display control device 402 acquires the above-described data from the sensor group 401, and acquires the difficulty level of the automated traveling control of the vehicle 1 based on the data. Specifically, the display control device 402 of the vehicle 1 determines the difficulty level of the automated traveling control of the vehicle 1 based on the above-described data, and acquires the difficulty level. The above-described control device 2 (FIG. 1) may function as the display control device 402. For example, the display control device 402 may acquire the difficulty level of the automated traveling control divided in three levels, a low difficulty level, a medium difficulty level, and a high difficulty level. The display control device 402 raises the difficulty level of the automated traveling control in a case where the traffic volume around the vehicle 1 is high, a case where there is a transportation vulnerable (such as a pedestrian) in the vicinity of the vehicle 1, a case where a specific operation such as a lane change is planned, or the like. After acquiring the difficulty level, the display control device 402 supplies a display command for causing the display device 403 to perform display according to the difficulty level to the display device 403.

Figure 5:
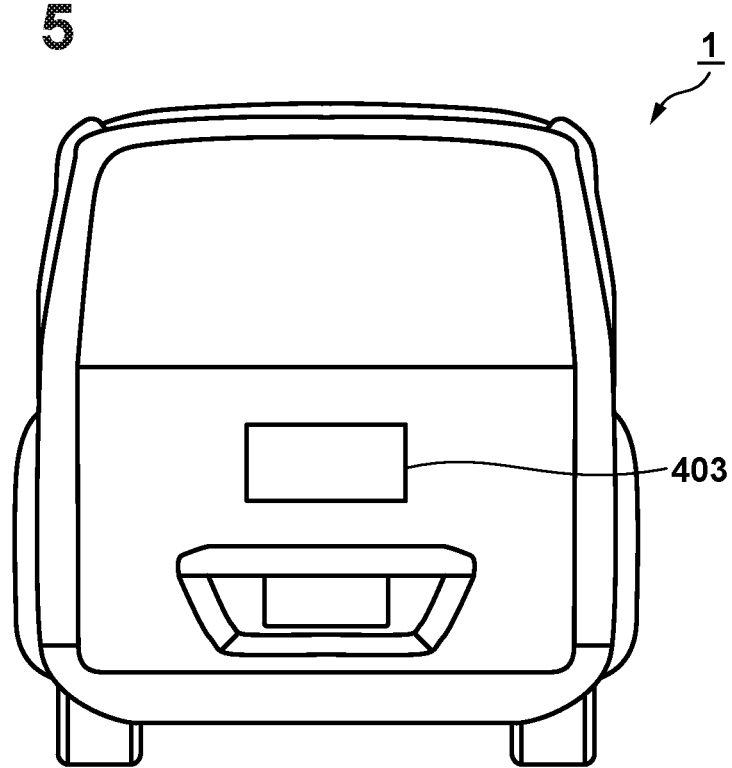
FIG. 5 is a schematic diagram for describing an example of a mounting position of the display device according to the embodiment.

A mounting position of the display device 403 will be described with reference to FIG. 5. FIG. 5 is a schematic view of the vehicle 1 as viewed from the rear side. The display device 403 is mounted on the rear side of the exterior of the vehicle 1. A display surface of the display device 403 faces an area behind the vehicle 1. That is, the display device 403 is a display device for visual recognition by a person (for example, a driver of a following vehicle) behind the vehicle 1. The display control device 402 causes the display device 403 to perform display according to the difficulty level of the automated traveling control. With reference to the display, the driver of the following vehicle can take an action corresponding thereto (for example, increasing an inter-vehicle distance). The display device 403 may be mounted at a position where the display is performed toward a person in front of and/or on a side of the vehicle 1.

The display device 403 may display the difficulty level by character information. For example, in a case where the difficulty level of the automated traveling control is high, the display device 403 may display a message such as "the vehicle is traveling in a state where the difficulty level is high". Alternatively or additionally, the display device may display the difficulty level by color information. For example, the display device 403 emits blue light in a case where the difficulty level is low, emits yellow light in a case where the difficulty level is medium, and emits red light in a case where the difficulty level is high. The display control device 402 may cause the display device 403 to perform display in a mode according to the difficulty level of the automated traveling control. For example, the display device 403 displays the difficulty level only by the character information in a case of the low difficulty level or the medium difficulty level, and displays the difficulty level by the color information in addition to the character information in a case of the high difficulty level.

Figure 6A:
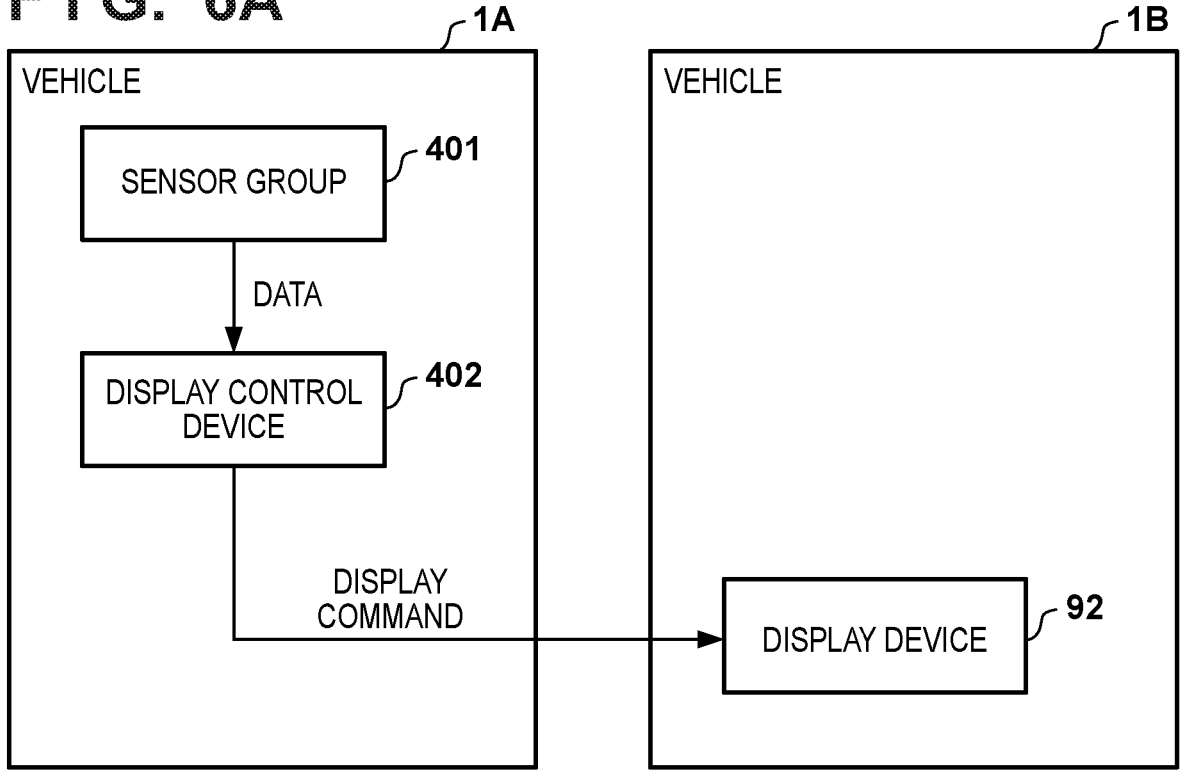
FIG. 6A is a block diagram for describing an example of the configuration of the display control device and the display device according to the embodiment.

A case where the display control device 402 is included in a vehicle 1A and a display device 92 is included in another vehicle 1B will be described with reference to FIG. 6A. Each of the vehicle 1A and the vehicle 1B may have a configuration similar to that of the vehicle 1 in FIG. 1. Alternatively, the vehicle 1B including the display device 92 does not have to have the automated driving function and the remote driving function. The vehicle 1A includes the sensor group 401 described above. The display control device 402 acquires the difficulty level of the automated traveling control in a similar manner to that in the configuration example of FIG. 4.

After acquiring the difficulty level, the display control device 402 supplies a display command for causing the display device 92 to perform display according to the difficulty level to the display device 92 of the surrounding vehicle 1B. The display device 92 is a display device for visual recognition by a driver of the vehicle 1B. The display command is supplied by, for example, vehicle-to-vehicle communication. In a case where there are a plurality of vehicles around the vehicle 1A, the display control device 402 may supply the display command to each vehicle. The display control device 402 may supply information for identifying the self-vehicle (for example, a vehicle type, a vehicle body color, an automobile registration number, and a relative position from the vehicle 1B) together with the display command.

The display device 92 performs display according to the difficulty level of the automated traveling control of the vehicle 1A according to the display command. The display may be performed by using, for example, character information, image information, and/or color information. The display device 92 may display the information for identifying the vehicle 1A while performing the display. With reference to the display, the driver of the surrounding vehicle 1B can take an action corresponding thereto (for example, increasing an inter-vehicle distance).

The display command from the display control device 402 to the display device 92 may be supplied via another device. For example, the display control device 402 of the vehicle 1A may supply the display command to the control device 2 of the vehicle 1B, and the control device 2 of the vehicle 1B may control the display performed by the display device 92 of the vehicle 1B based on the display command. In addition, in a case where the display according to the difficulty level of the automated traveling control of the vehicle 1A is performed by the display device 92 of the vehicle 1B, the supply of the difficulty level by the display control device 402 of the vehicle 1A to the vehicle 1B may be regarded as the supply of the display command.

Figure 6B:
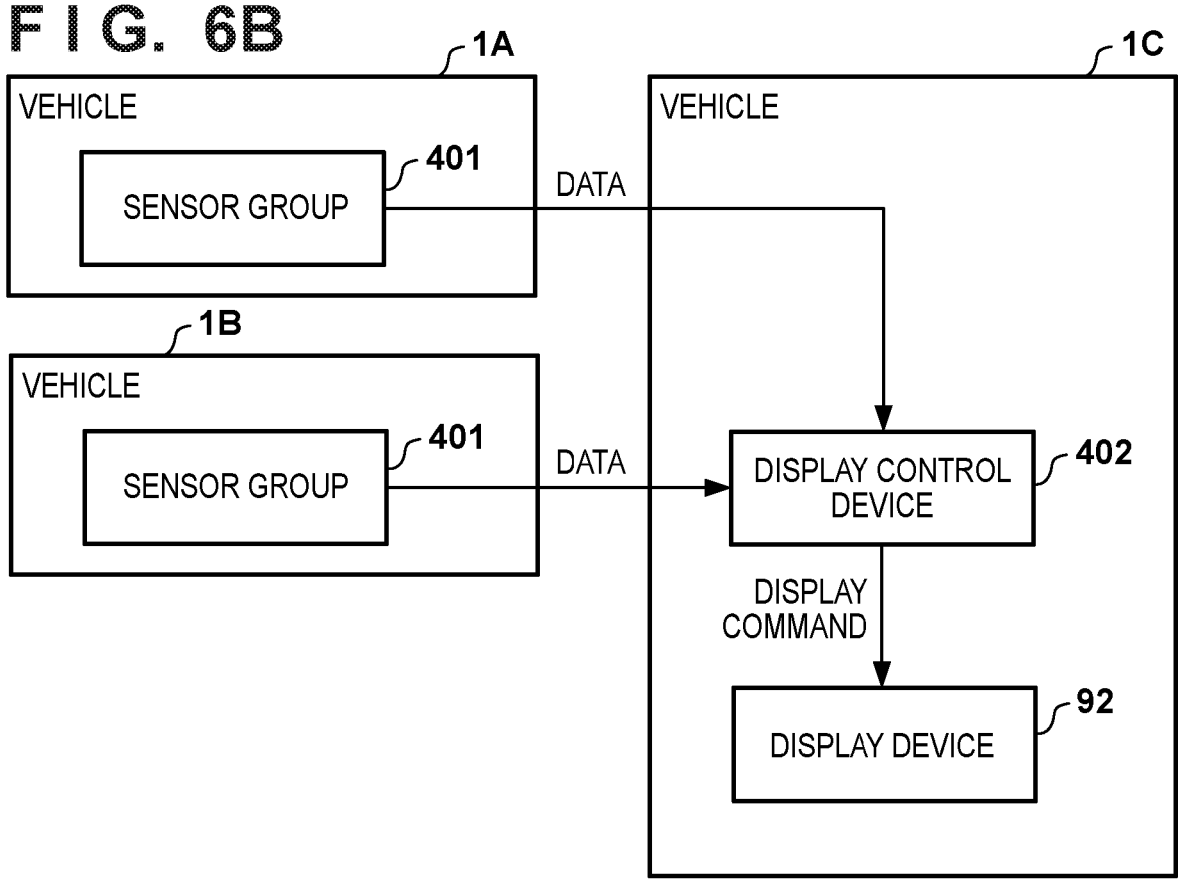
FIG. 6B is a block diagram for describing an example of the configuration of the display control device and the display device according to the embodiment.

A case where the display control device 402 and the display device 92 are included in the same vehicle 1C, and the display control device 402 displays information regarding the vehicle 1A and the vehicle 1B on the display device 92 will be described with reference to FIG. 6B. Each of the vehicle 1A, the vehicle 1B, and the vehicle 1C may have a configuration similar to that of the vehicle 1 in FIG. 1. Alternatively, the vehicle 1C including the display device 92 does not have to have the automated driving function and the remote driving function. Each of the vehicle 1A and the vehicle 1B includes the sensor group 401 described above.

Figure 4:
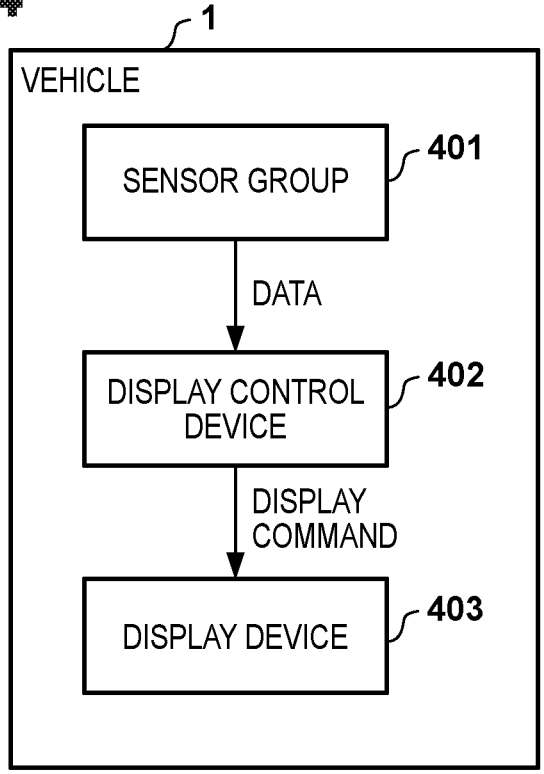
FIG. 4 is a block diagram for describing an example of a configuration of a display control device and a display device according to the embodiment.

The display control device 402 acquires data used to acquire the difficulty level of the automated traveling control from the sensor group 401 of each of the vehicle 1A and the vehicle 1B, and acquires the difficulty level of the automated traveling control in a similar manner to that in the configuration example of FIG. 4. Transmission and reception of data are performed, for example, by vehicle-to-vehicle communication. Alternatively, the transmission and reception of data may be performed via another device. The display control device 402 may acquire information for identifying the vehicle (for example, a vehicle type, a vehicle body color, an automobile registration number, and a relative position from the vehicle 1C) together with the data.

After acquiring the difficulty level, the display control device 402 causes the display device 92 to perform display according to the difficulty level of the automated traveling control of each of the vehicle 1A and the vehicle 1B. The display device 92 is a display device for visual recognition by a driver of the vehicle 1C. The display may be performed by using, for example, character information, image information, and/or color information. The display device 92 may display the information for identifying the vehicle 1A and the vehicle 1B while performing the display. With reference to the display, the driver of the vehicle 1C can take an action corresponding thereto (for example, increasing an inter-vehicle distance).

Figure 7:
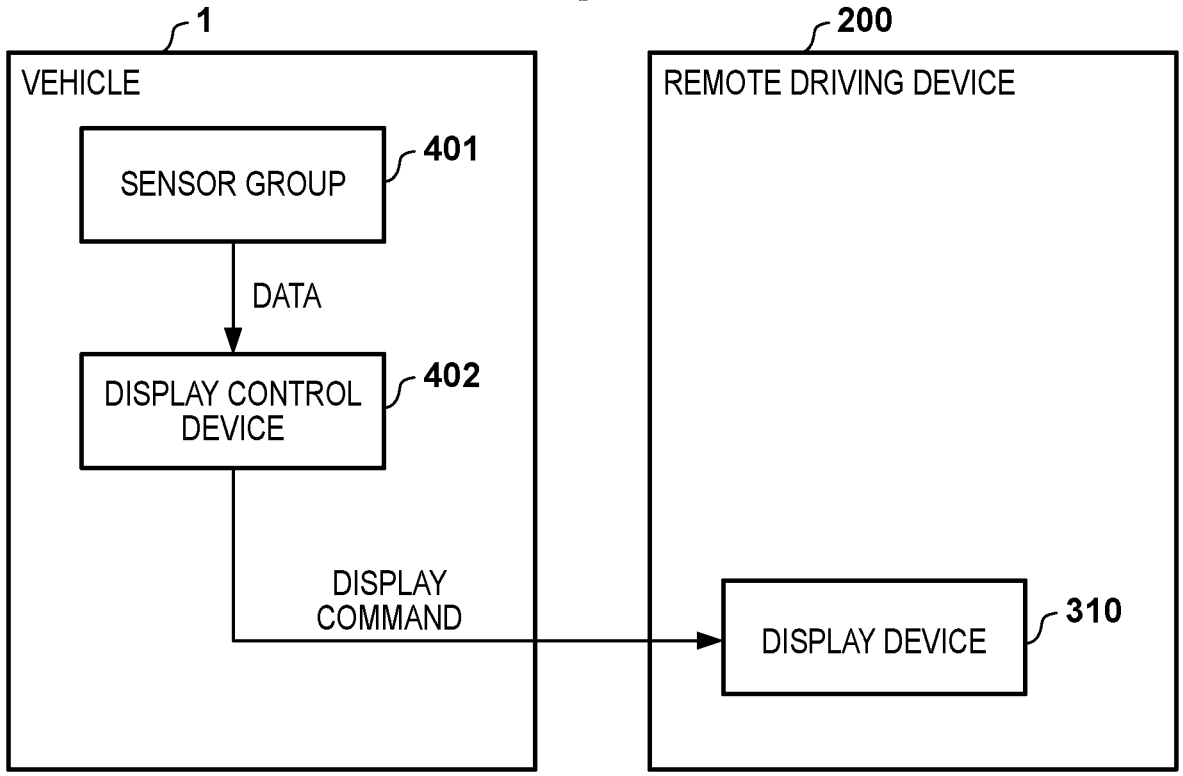
FIG. 7 is a block diagram for describing an example of the configuration of the display control device and the display device according to the embodiment.

A case where the display control device 402 is included in the vehicle 1 and a display device 310 is included in the remote driving device 200 will be described with reference to FIG. 7. The vehicle 1 includes the sensor group 401 described above. The display control device 402 acquires the difficulty level of the automated traveling control in a similar manner to that in the configuration example of FIG. 4.

After acquiring the difficulty level, the display control device 402 supplies a display command for causing the display device 310 to perform display according to the difficulty level to the display device 310 of the remote driving device 200. The display device 310 is a display device for visual recognition by the user of the remote driving device 200. The display control device 402 may supply information for identifying the self-vehicle (for example, a service ID of remote driving) together with the display command.

The display device 310 performs display according to the difficulty level of the automated traveling control of the vehicle 1 according to the display command. The display may be performed by using, for example, character information, image information, and/or color information. The display device 310 performs display for the vehicle 1 that is a target of the remote driving service according to the difficulty level of the automated traveling control in association with other information regarding the vehicle 1. For example, in a case where information regarding the vehicle 1 is displayed in one sub region 312, the display device 310 performs display for the sub region 312 according to the difficulty level. With reference to the display, the operator of the remote driving device 200 can take an action (for example, display switching to the main region 311) corresponding to the display.

As described above, information regarding the monitoring target vehicle is displayed in each sub region 312, and information regarding the operation target vehicle is displayed in the main region 311. A display mode used when the user of the remote driving device 200 monitors the vehicle 1 is referred to as a monitoring display mode. In the monitoring display mode, information regarding the monitoring target vehicle is displayed in the sub region 312. A display mode used when the user of the remote driving device 200 remotely operates the vehicle 1 is referred to as an operation display mode. In the operation display mode, information regarding the operation target vehicle is displayed in the main region 311. The main region 311 is larger than the sub region 312. Therefore, the user of the remote driving device 200 can grasp more detailed information on the operation target vehicle 1.

In a case where the difficulty level of the automated traveling control of the monitoring target vehicle is higher than a threshold, the display control device 402 may cause the display device 310 to display an image related to the vehicle in the operation display mode. For example, the difficulty level of the automated traveling control is divided in three levels (A is the highest difficulty level), "A", "B", and "C". In a case where the difficulty level of the automated traveling control of the monitoring target vehicle is "A", the display control device 402 may switch the monitoring target vehicle to the control target vehicle and display the control target vehicle in the main region 311 in the operation display mode. In a case where the difficulty level of the automated traveling control of the monitoring target vehicle is "B" or "C", the display performed in the monitoring display mode is continued. In this case, a borderline between "A" and "B" is the threshold.

In a case where there is another vehicle displayed in the main region 311, the display control device 402 may inquire of the user which one of the vehicle being displayed and the vehicle whose difficulty level exceeds the threshold is to be displayed in the main region 311. The display control device 402 may transfer the remote driving service of one vehicle to another remote driving device 200.

Figure 12:
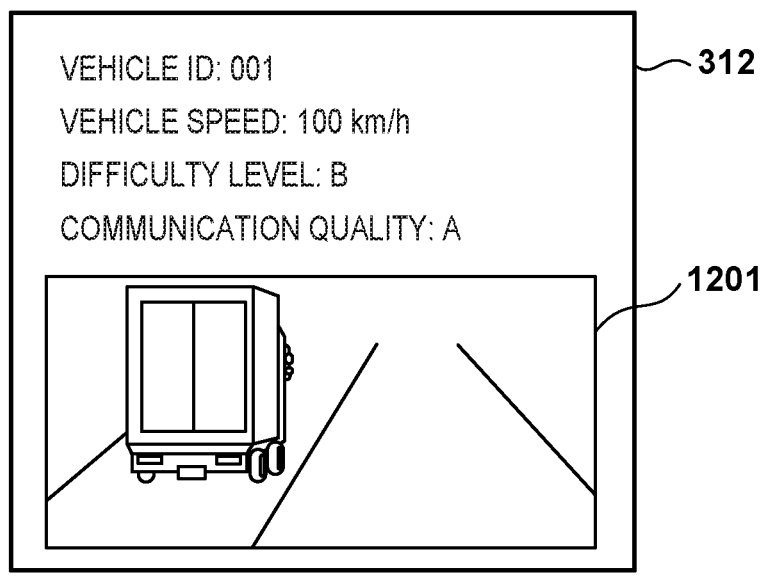
FIG. 12 is a schematic diagram for describing a display example of a screen according to the embodiment.

A screen displayed in the sub region 312 in the monitoring display mode will be described with reference to FIG. 12. In the sub region 312, character information and an image 1201 are displayed. The character information includes a vehicle ID, a vehicle speed, a difficulty level, and communication quality. The "vehicle ID" is an identifier for uniquely identifying the service providing target vehicle 1. The "vehicle speed" is the current speed of the vehicle 1. The "difficulty level" is the current difficulty level of the automated traveling control of the vehicle 1. The "communication quality" is the current quality of communication of the communication device provided in the vehicle 1. The communication quality is divided in three levels (A is the highest communication quality), "A", "B", and "C", and displayed. The image 1201 is an image corresponding to the viewpoint of the driver of the vehicle 1. This image is generated, for example, based on data from the camera 41 mounted on the vehicle 1.

Figure 13:
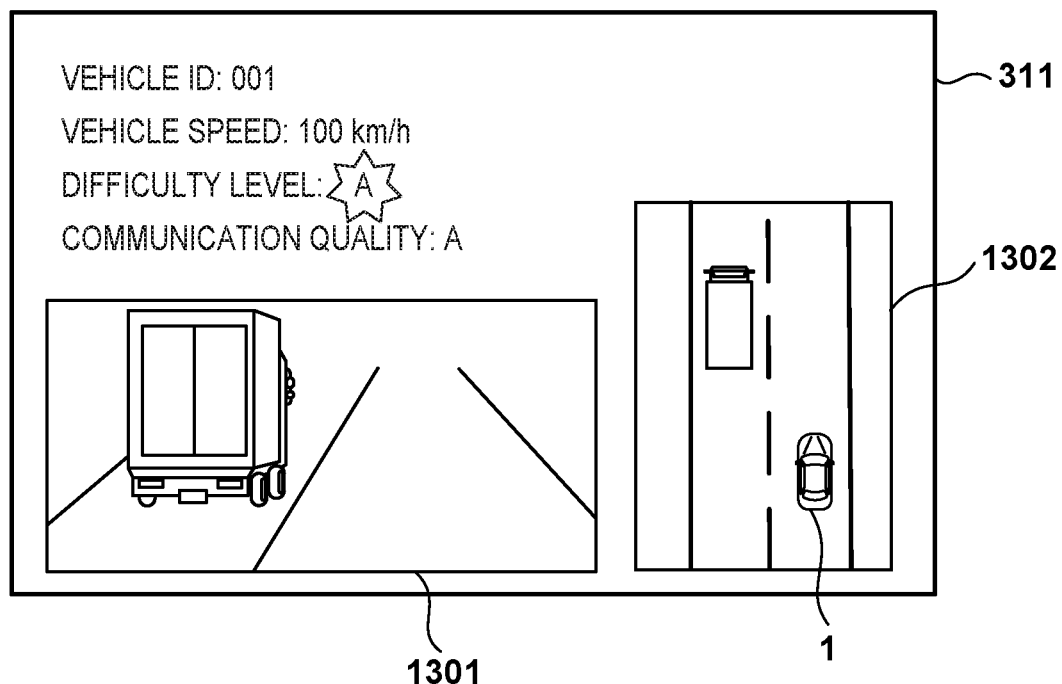
FIG. 13 is a schematic diagram for describing a display example of a screen according to the embodiment.

A screen displayed in the sub region 311 in the operation display mode will be described with reference to FIG. 13. In the main region 311, character information and images 1301 and 1302 are displayed. The character information is similar to that displayed in the sub region 311. However, the difficulty level exceeding the threshold (in this example, "A") is highlighted. The image 1301 is an image corresponding to the viewpoint of the driver of the vehicle 1. Since the main region 311 is larger than the sub region 312, the display control device 402 can display the image 1301 in a larger size than the image 1201. Therefore, the user of the remote driving device 200 can grasp more information on the viewpoint of the driver of the vehicle 1. The image 1302 is an overhead view of the periphery of the vehicle 1. This image is generated based on, for example, data from the detection units 41 to 43 mounted on the vehicle 1 or data from a road infrastructure.

Figure 14:
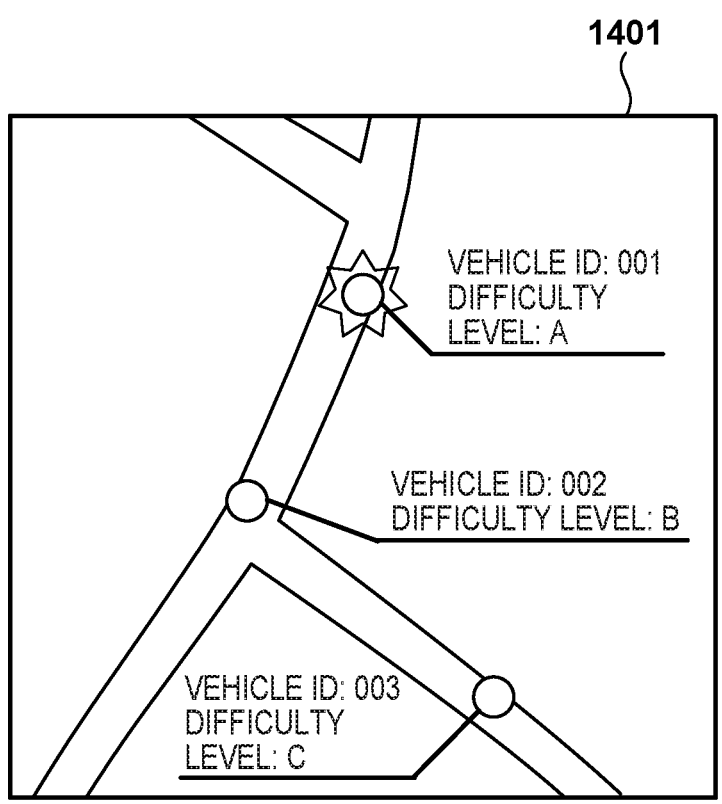
FIG. 14 is a schematic diagram for describing a display example of a screen according to the embodiment.

An image 1401 in which position information and the difficulty level of each of the plurality of vehicles 1 are collectively displayed will be described with reference to FIG. 14. The image 1401 may be always displayed on the display device 310, or may be displayed on the display device 310 in response to a request from the user of the remote driving device 200. In addition, the image 1401 may be displayed in the main region 311, or may be displayed in a region other than the main region 311 and the sub region 312.

In the image 1401, the position of each of the plurality of vehicles is indicated by a circle on the map. In addition, in the image 1401, the vehicle ID and the difficulty level of each vehicle are indicated in association with the position of each vehicle indicated by a circle. That is, information including the difficulty level of each vehicle is displayed on a screen (for example, on a map) that displays a road in association with the geographical position of the vehicle. Also in this image, a vehicle (in this example, a vehicle whose vehicle ID is "001") having a higher difficulty level than the threshold may be highlighted. In order to generate the image 1401, the display control device 402 acquires the position of each vehicle in addition to the difficulty level of the automated traveling control of each vehicle.

The display command from the display control device 402 to the display device 310 may be supplied via another device. For example, the display control device 402 of the vehicle 1 may supply the display command to the processor 201 of the remote driving device 200, and the processor 201 may control the display performed by the display device 310 based on the display command. In addition, in a case where the display according to the difficulty level of the automated traveling control of the vehicle 1 is performed by the display device 310 of the remote driving device 200, the supply of the difficulty level by the display control device 402 of the vehicle 1 to the remote driving device 200 may be regarded as the supply of the display command.

Figure 8:
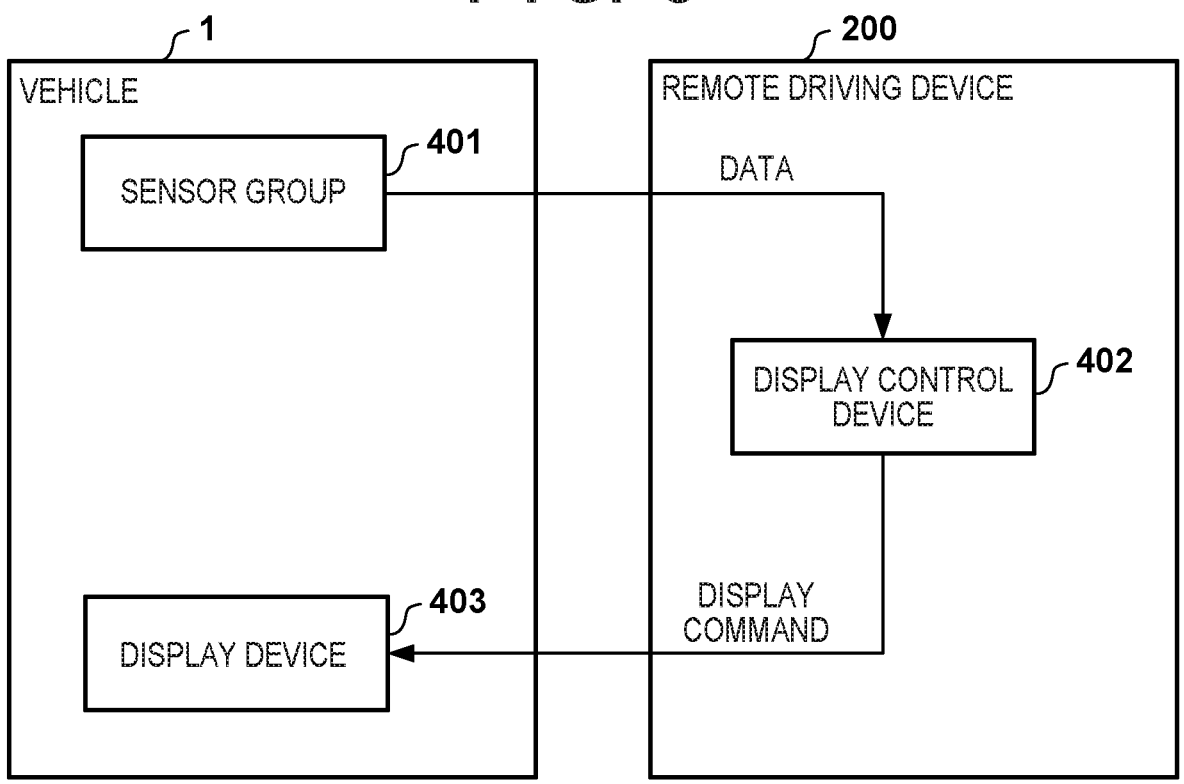
FIG. 8 is a block diagram for describing an example of the configuration of the display control device and the display device according to the embodiment.

A case where the display control device 402 is included in the remote driving device 200 and the display device 403 is included in the vehicle 1 will be described with reference to FIG. 8. The vehicle 1 includes a sensor group 401 that acquires data used to acquire the difficulty level of the automated traveling control. The display control device 402 acquires data used to acquire the difficulty level of the automated traveling control from the sensor group 401 of the vehicle 1, and acquires the difficulty level of the automated traveling control in a similar manner to that in the configuration example of FIG. 4. In this example, the display control device 402 of the remote driving device 200 determines the difficulty level of the automated traveling control of the vehicle 1 based on the above-described data, and acquires the difficulty level. The processor 201 of the remote driving device 200 described above may function as the display control device 402.

After acquiring the difficulty level, the display control device 402 supplies the display command for causing the display device 403 to perform display according to the difficulty level to the display device 403 of the vehicle 1 that is the data supply source. A configuration of the display performed by the display device 403 may be similar to that described in FIGS. 4 and 5.

Figure 9:
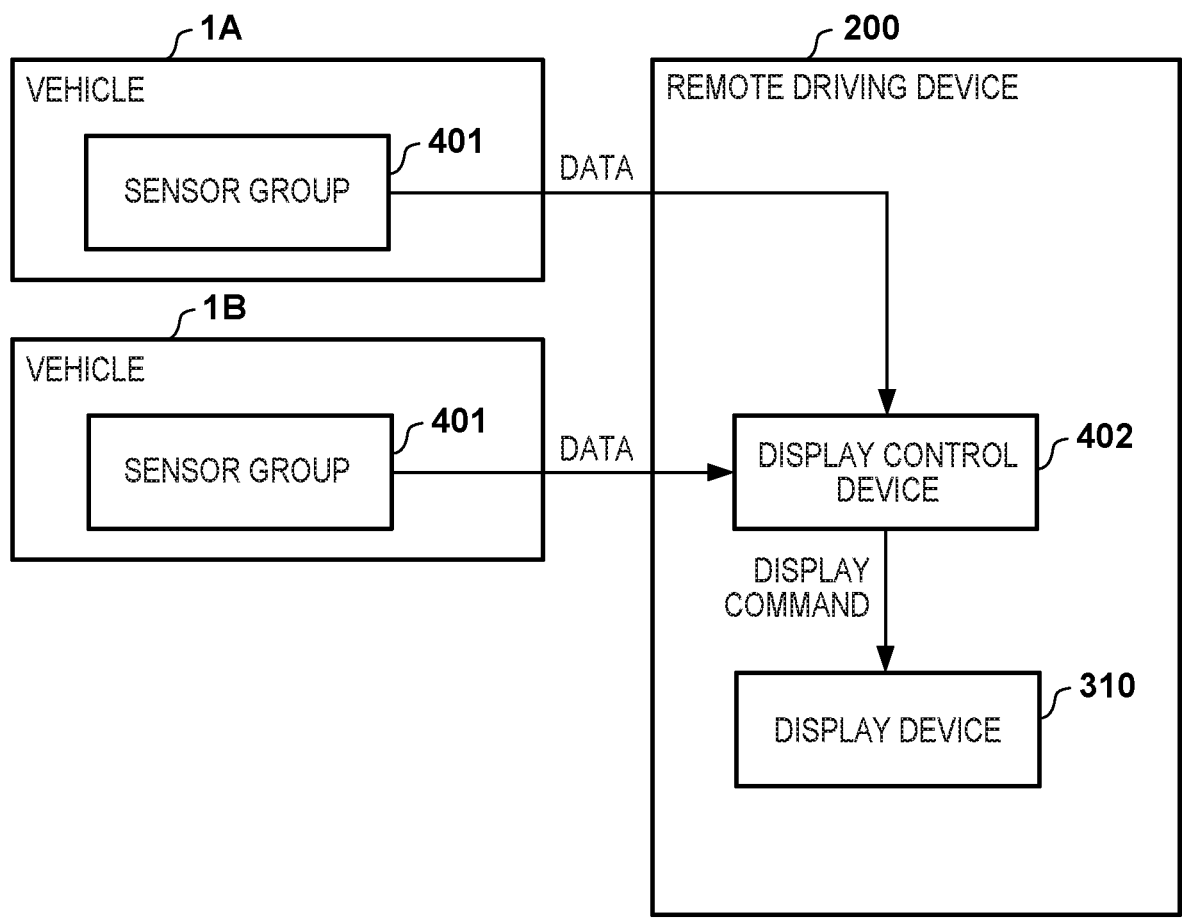
FIG. 9 is a block diagram for describing an example of the configuration of the display control device and the display device according to the embodiment.

A case where the display control device 402 and the display device 310 are included in the remote driving device 200 will be described with reference to FIG. 9. The vehicle 1 includes the sensor group 401 described above. The display control device 402 acquires data used to acquire the difficulty level of the automated traveling control from the sensor group 401 of the vehicle 1A, and acquires the difficulty level of the automated traveling control in a similar manner to that in the configuration example of FIG. 4.

After acquiring the difficulty level, the display control device 402 supplies a display command for causing the display device 310 to perform display according to the difficulty level to the display device 310 of the remote driving device 200. A configuration of the display performed by the display device 403 may be similar to that described in FIGS. 7 and 12 to 14.

The remote driving device 200 may acquire data used to acquire the difficulty level of the automated traveling control from each of the plurality of vehicles 1A and 1B to which the remote driving service is to be provided, and acquire the difficulty level of the automated traveling control of each vehicle. In this case, the remote driving device 200 causes the display device 310 to perform display according to the difficulty level in association with each vehicle. For example, the display device 310 performs display according to the difficulty level of the vehicle 1A in a display region (the main region 311 or any sub region 312) corresponding to the vehicle 1A, and performs display according to the difficulty level of the vehicle 1B in a display region (the main region 311 or any sub region 312) corresponding to the vehicle 1B.

Figure 10:
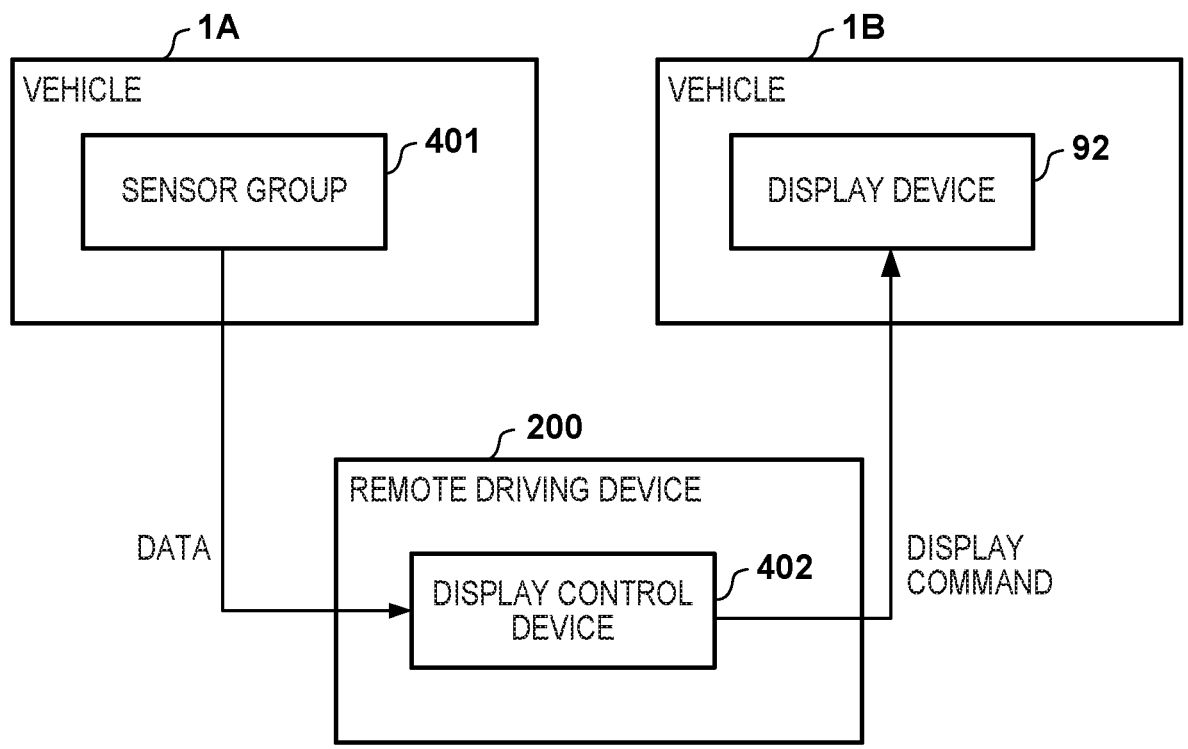
FIG. 10 is a block diagram for describing an example of the configuration of the display control device and the display device according to the embodiment.

A case where the display control device 402 is included in the remote driving device 200 and the display device 92 is included in the vehicle 1B will be described with reference to FIG. 10. Each of the vehicle 1A and the vehicle 1B may have a configuration similar to that of the vehicle 1 in FIG. 1. Alternatively, the vehicle 1B including the display device 92 does not have to have the automated driving function and the remote driving function. The vehicle 1A includes the sensor group 401 described above. The display control device 402 acquires data used to acquire the difficulty level of the automated traveling control from the plurality of vehicles 1A to which the remote driving service is to be provided, and acquires the difficulty level of the automated traveling control in a similar manner to that in the configuration example of FIG. 8.

After acquiring the difficulty level, the display control device 402 supplies a display command for causing the display device 92 to perform display according to the difficulty level to the display device 92 of the vehicle 1B in the vicinity of the vehicle 1A. The display performed by the display device 92 is similar to that described in FIG. 6A.

Figure 11:
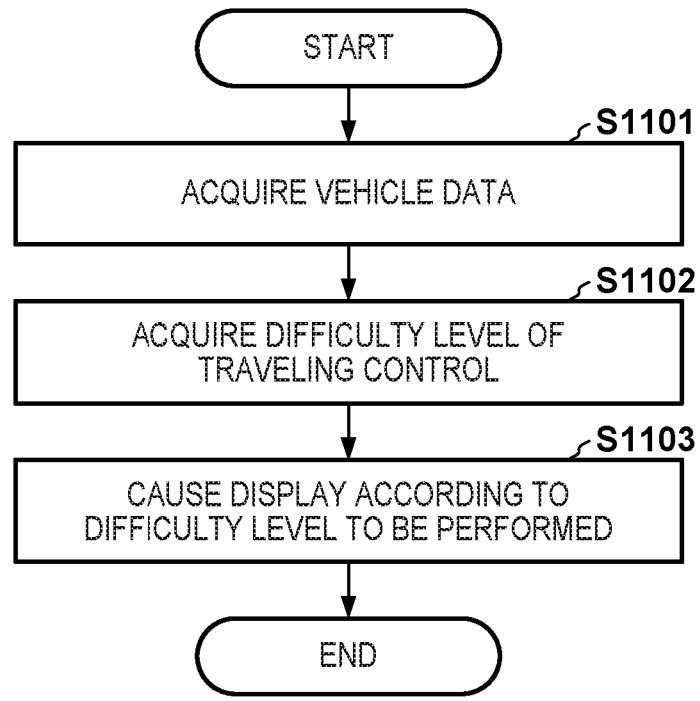
FIG. 11 is a flowchart for describing an example of a display control method according to the embodiment.

A display control method executed by the display control device 402 will be described with reference to FIG. 11. This control method may be executed by a processor of the display control device 402 (specifically, the control device 2 or the remote driving device 200) executing a program stored in a memory. Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 11 is repeatedly executed while the vehicle 1 is performing the automated traveling control.

In step S1101, as described in detail with reference to FIGS. 4 to 10, the display control device 402 acquires data used to acquire the difficulty level of the automated traveling control from the sensor group 401 of the vehicle 1. In step S1102, the display control device 402 acquires the difficulty level of the automated traveling control of the vehicle 1 as described in detail with reference to FIGS. 4 to 10. In step S1103, the display control device 402 causes the display device to perform display according to the difficulty level as described in detail with reference to FIGS. 4 to 10.

In the above-described embodiment, the present disclosure has been described by taking the vehicle 1 as an example. Alternatively, the present disclosure may be applied to a mobile object other than a vehicle.

Summary of Embodiment

<Configuration 1>

A display control device (402), including:

acquisition means (20*a*, 201, and S1102) that acquires a difficulty level of an automated traveling control of a mobile object (1 and 1A); and control means (20*a*, 201, and S1103) that causes a display device (92, 310, and 403) for visual recognition by a person outside the mobile object whose difficulty level has been acquired to perform display according to the difficulty level.

With this configuration, it is possible to effectively utilize the information regarding the difficulty level of the automated traveling control of the mobile object. Specifically, since the person outside the mobile object can know the difficulty level of the automated traveling control of the mobile object, an action corresponding thereto can be taken.

<Configuration 2>

The display control device according to Configuration 1, wherein the control means causes the display device to perform display in a mode according to the difficulty level.

With this configuration, the person outside the mobile object can more easily determine the difficulty level of the automated traveling control of the mobile object.

<Configuration 3>

The display control device according to Configuration 1 or 2, wherein the display device is mounted on the mobile object whose difficulty level is acquired by the acquisition means.

With this configuration, since the display device of the mobile object displays the difficulty level of the automated traveling control of the mobile object, the person outside the mobile object can easily determine which mobile object the difficulty level relates to.

<Configuration 4>

The display control device according to Configuration 1 or 2, wherein the display device is mounted on a mobile object (1B) different from the mobile object (1A) whose difficulty level is acquired by the acquisition means.

With this configuration, since the difficulty level of the automated traveling control is displayed on the mobile object of the person outside the mobile object, the difficulty level is displayed at a position easily seen by the person outside the mobile object.

<Configuration 5>

The display control device according to Configuration 1 or 2, wherein the display device is a display device (310) for visual recognition by a user of a remote driving device (200) that provides a remote driving service to the mobile object whose difficulty level is acquired by the acquisition means.

With this configuration, the operator of the remote driving device that provides the remote driving service to the mobile object can take an action according to the difficulty level.

<Configuration 6>

The display control device according to Configuration 5, wherein the control means is configured to display an image related to the mobile object in any one of a first display mode or a second display mode, and causes the display device to display the image (1301 and 1302) related to the mobile object in the second display mode in a case where the difficulty level of the automated traveling control of the mobile object is higher than a threshold.

With this configuration, it is possible to display the image related to the mobile object in the display mode according to the difficulty level of the automated traveling control.

<Configuration 7>

The display control device according to Configuration 6, wherein the first display mode is used when the user of the remote driving device monitors the mobile object, and the second display mode is used when the user of the remote driving device remotely operates the mobile object.

With this configuration, different display modes can be used in a case where the user monitors the mobile object and a case where the user remotely operates the mobile object, respectively.

<Configuration 8>

The display control device according to Configuration 6 or 7, wherein in a case where the difficulty level of the automated traveling control of the mobile object is higher than the threshold, the control means increases a size of a display region (311) of the image related to the mobile object as compared with a case where the difficulty level is lower than the threshold.

With this configuration, in a case where the difficulty level is high, information regarding the mobile object can be provided in more detail.

<Configuration 9>

The display control device according to Configuration 8, wherein the control means causes the image related to the mobile object to be displayed in a first region (311) of the display device in a case where the difficulty level of the automated traveling control of the mobile object is higher than the threshold, and causes the image related to the mobile object to be displayed in a second region (312) of the display device in a case where the difficulty level of the automated traveling control of the mobile object is lower than the threshold.

With this configuration, it is possible to display the image related to the mobile object in the region according to the difficulty level.

<Configuration 10>

The display control device according to Configuration 9, wherein the first region is larger than the second region.

With this configuration, in a case where the difficulty level is high, information regarding the mobile object can be provided in more detail.

<Configuration 11>

The display control device according to any one of Configurations 1 to 5, wherein the acquisition means acquires the difficulty level determined by the mobile object.

With this configuration, the difficulty level can be determined based on data obtained with less delay.

<Configuration 12>

The display control device according to any one of Configurations 1 to 5, wherein the acquisition means acquires the difficulty level determined by a remote driving device (200) that provides a remote driving service to the mobile object.

With this configuration, the difficulty level can be determined by the remote driving device having excellent processing capability.

<Configuration 13>

The display control device according to any one of Configurations 1 to 12, wherein the acquisition means acquires a difficulty level of an automated traveling control of each of a plurality of mobile objects (1A and 1B), and the control means causes the display device to perform display according to the difficulty level in association with each mobile object.

With this configuration, the operator of the remote driving service can individually grasp the difficulty levels of the plurality of mobile objects.

<Configuration 14>

The display control device according to Configuration 13, wherein the control means causes the display device to highlight a mobile object whose difficulty level of the automated traveling control is higher than a threshold among the plurality of mobile objects.

With this configuration, the user can easily grasp the fact that the difficulty level is high.

<Configuration 15>

The display control device according to Configuration 13, wherein the control means causes a mobile object whose difficulty level of the automated traveling control is higher than a threshold among the plurality of mobile objects to be displayed in a first region (311) of the display device, and causes a mobile object whose difficulty level of the automated traveling control is lower than the threshold to be displayed in a second region (312) of the display device.

With this configuration, it is possible to display the image related to the mobile object in the region according to the difficulty level.

<Configuration 16>

The display control device according to Configuration 15, wherein the first region is larger than the second region.

With this configuration, in a case where the difficulty level is high, information regarding the mobile object can be provided in more detail.

<Configuration 17>

The display control device according to any one of Configurations 13 to 16, wherein the acquisition means acquires a position of each of the plurality of mobile objects, and the control means causes the display device to perform display (1401) according to the difficulty level in association with the position of each mobile object.

With this configuration, the position of the mobile object and the difficulty level can be grasped in association with each other.

<Configuration 18>

A program for causing a computer to function as each means of the display control device according to any one of Configurations 1 to 17.

With this configuration, the disclosure can be provided in a form of a program.

<Configuration 19>

A display control method, including:

an acquisition step (S1102) of acquiring a difficulty level of an automated traveling control of a mobile object (1 and 1A); and a control step (S1103) of causing a display device (92, 310, and 403) for visual recognition by a person outside the mobile object whose difficulty level has been acquired to perform display according to the difficulty level.

With this configuration, it is possible to effectively utilize the information regarding the difficulty level of the automated traveling control of the mobile object. Specifically, since the person outside the mobile object can know the difficulty level of the automated traveling control of the mobile object, an action corresponding thereto can be taken.

The present invention is not limited to the above-described embodiment, and various changes and modifications can be made without departing from the spirit and scope of the present invention. Therefore, in order to make the scope of the present invention public, the following claims are attached.

What is claimed is:

1. A display control device, comprising:
at least one processor circuit with a memory comprising instructions, that when executed by the processor circuit, cause the at least one processor circuit to at least:
acquire a difficulty level of an automated traveling control of a mobile object;
cause a display device for visual recognition by a user of a remote driving device that provides a remote driving service to the mobile object whose difficulty level has been acquired to:
display an image related to the mobile object in any one of a first display mode used when the user of the remote driving device monitors the mobile object or a second display mode used when the user of the remote driving device remotely operates the mobile object; and
display the image related to the mobile object in the second display mode in a case where the difficulty level of the automated traveling control of the mobile object is higher than a threshold; and
in a case where a difficulty level of a first vehicle exceeds the threshold while an image related to a second vehicle is displayed in the second display mode, inquire of the user which one of the first and second vehicles is to be displayed in the second display mode.

2. The display control device according to claim 1, wherein in a case where the difficulty level of the automated traveling control of the mobile object is higher than the threshold, the instructions, when executed by the processor circuit, further cause the at least one processor circuit to at least increase a size of a display region of the image related to the mobile object as compared with a case where the difficulty level is lower than the threshold.

3. The display control device according to claim 2, wherein the instructions, when executed by the processor circuit, further cause the at least one processor circuit to at least
cause the image related to the mobile object to be displayed in a first region of the display device in a case where the difficulty level of the automated traveling control of the mobile object is higher than the threshold, and
cause the image related to the mobile object to be displayed in a second region of the display device in a case where the difficulty level of the automated traveling control of the mobile object is lower than the threshold.

4. The display control device according to claim 3, wherein the first region is larger than the second region.

5. The display control device according to claim 1, wherein the instructions, when executed by the processor circuit, further cause the at least one processor circuit to at least acquire the difficulty level determined by the mobile object.

6. The display control device according to claim 1, wherein the instructions, when executed by the processor circuit, further cause the at least one processor circuit to at least acquire the difficulty level determined by a remote driving device that provides a remote driving service to the mobile object.

7. The display control device according to claim 1, wherein the instructions, when executed by the processor circuit, further cause the at least one processor circuit to at least:
acquire a difficulty level of an automated traveling control of each of a plurality of mobile objects; and cause the display device to perform display according to the difficulty level in association with each mobile object.

8. The display control device according to claim 7, wherein the instructions, when executed by the processor circuit, further cause the at least one processor circuit to at least cause the display device to highlight a mobile object whose difficulty level of the automated traveling control is higher than a threshold among the plurality of mobile objects.

9. The display control device according to claim 7, wherein the instructions, when executed by the processor circuit, further cause the at least one processor circuit to at least cause a mobile object whose difficulty level of the automated traveling control is higher than a threshold among the plurality of mobile objects to be displayed in a first region of the display device, and cause a mobile object whose difficulty level of the automated traveling control is lower than the threshold to be displayed in a second region of the display device.

10. The display control device according to claim 9, wherein the first region is larger than the second region.

11. The display control device according to claim 7, wherein the instructions, when executed by the processor circuit, further cause the at least one processor circuit to at least:

acquire a position of each of the plurality of mobile objects; and cause the display device to perform display according to the difficulty level in association with the position of each mobile object.

12. A non-transitory storage medium comprising a program for causing a computer to function as each unit of the display control device according to claim 1.

13. A display control method, comprising:

acquiring a difficulty level of an automated traveling control of a mobile object; and causing a display device for visual recognition by a user of a remote driving device that provides a remote driving service to the mobile object whose difficulty level has been acquired to:

display an image related to the mobile object in any one of a first display mode used when the user of the remote driving device monitors the mobile object or a second display mode used when the user of the remote driving device remotely operates the mobile object; and display the image related to the mobile object in the second display mode in a case where the difficulty level of the automated traveling control of the mobile object is higher than a threshold; and in response to the determination that a difficulty level of a first vehicle exceeds the threshold while an image related to a second vehicle is displayed in the second display mode, inquiring of the user which one of the first and second vehicles is to be displayed in the second display mode.

\* \* \* \* \*